(12) United States Patent
Porat et al.

(10) Patent No.: US 9,608,703 B2
(45) Date of Patent: Mar. 28, 2017

(54) CLOSED LOOP MIMO HARMONIZED FEEDBACK

(75) Inventors: Ron Porat, San Diego, CA (US); Wee Peng Goh, San Diego, CA (US); Yair Bourlas, San Diego, CA (US)

(73) Assignee: MONUMENT BANK OF INTELLECTUAL PROPERTY, LLC, Dallas, TX (US)

( * ) Notice: Subject to any disclaimer, the term of this patent is extended or adjusted under 35 U.S.C. 154(b) by 2289 days.

(21) Appl. No.: 12/397,300

(22) Filed: Mar. 3, 2009

(65) Prior Publication Data

US 2010/0226455 A1    Sep. 9, 2010

(51) Int. Cl.
*H04B 7/04*    (2006.01)
*H04B 7/02*    (2017.01)

(52) U.S. Cl.
CPC ......... *H04B 7/0417* (2013.01); *H04B 7/024* (2013.01)

(58) Field of Classification Search
USPC ........ 375/267, 260, 299, 296, 347, 349, 346
See application file for complete search history.

(56) References Cited

U.S. PATENT DOCUMENTS

2010/0189049 A1* 7/2010 Lim et al. ................. 370/329

OTHER PUBLICATIONS

Porat et al., "CL-MIMO: New Codebook and Feedback Mechanism," IEEE 802.16 Broadband Wireless Access Working Group, IEEE S80216maint.-192r1 (May 10, 2008).

* cited by examiner

*Primary Examiner* — Kabir A Timory
(74) *Attorney, Agent, or Firm* — Ascenda Law Group, PC (57) ABSTRACT

The subject matter disclosed herein provides methods and apparatus for closed loop operation of a wireless system implementing multiple input multiple output (MIMO). In one aspect, there is provided a method. The method may include receiving a payload including channel estimation information. Moreover, one or more bits of the payload may be inserted into a subset of the tiles of a slot. The slot including the subset of the tiles carrying the one or more bits of the payload may be provided as part of a closed loop MIMO-based system. Related systems, apparatus, methods, and/or articles are also described.

20 Claims, 10 Drawing Sheets

CLOSED LOOP MIMO HARMONIZED FEEDBACK

FIELD

The subject matter described herein relates to wireless communications, and, in particular, wireless communication systems implementing multiple-input multiple-output (MIMO).

BACKGROUND

In wireless systems, multiple antenna technologies may be used to improve performance. MIMO (multiple-input multiple-output) is a multiple antenna technology that typically provides increased performance when compared to a single antenna implementation. MIMO may be implemented as either open loop or closed loop.

In open loop MIMO, the communications channel does not utilize explicit information regarding the propagation channel. Open loop MIMO techniques include, for example, Space Time Block Coding (STBC), Spatial Multiplexing (SM-MIMO), and Collaborative Uplink MIMO. The WiMAX standard includes two versions of Open Loop MIMO techniques referred to as Matrix A, which includes the STBC technique, and Matrix B, which includes the SM-MIMO technique.

In the case of closed loop MIMO, the transmitter collects information regarding the channel to optimize communications to the intended receiver. Closed loop MIMO implementations typically use techniques, such as Maximum Ratio Transmission (MRT) or Statistical Eigen Beamforming (EBF) techniques, both of which are simply referred to as "beamforming."

SUMMARY

The subject matter disclosed herein provides methods and apparatus for closed loop operation of a wireless system implementing multiple-input multiple-output (MIMO).

In one aspect, there is provided a method. The method may include receiving a payload including channel estimation information. Moreover, one or more bits of the payload may be inserted into a subset of the tiles of a slot. The slot including the subset of the tiles carrying the one or more bits of the payload may be provided as part of a closed loop MIMO-based system.

Variations of the above aspects may include one or more of the following features. The payload may be configured to 6 bits including a precoder matrix index. The payload may be configured to 6 bits including 4 bits representing a precoder matrix index and 2 bits representing a differential carrier-to-interference-plus-noise ratio. The payload may be configured to 6 bits comprising 3 bits representing a precoder matrix index, 2 bits representing a differential carrier-to-interference-plus-noise ratio, and 1 bit representing rank information. The payload may be inserted into a subset of ½ of the tiles of the slot. The payload may be inserted into a subset of ⅓ of the tiles of the slot. Eighteen bits of the payload may be inserted into tiles of the slot. The payloads may be inserted into the even tiles of the slot. The payloads may be inserted into the odd tiles of the slot. The slot may be transmitted from a client station to a base station, wherein the slot includes the subset of the tiles carrying the one or more bits of the payload using a channel quality indicator channel. One or more of the above-noted variations and/or aspect may be implemented as a system, an apparatus, a methods, and/or an articles.

The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

Figure 1:
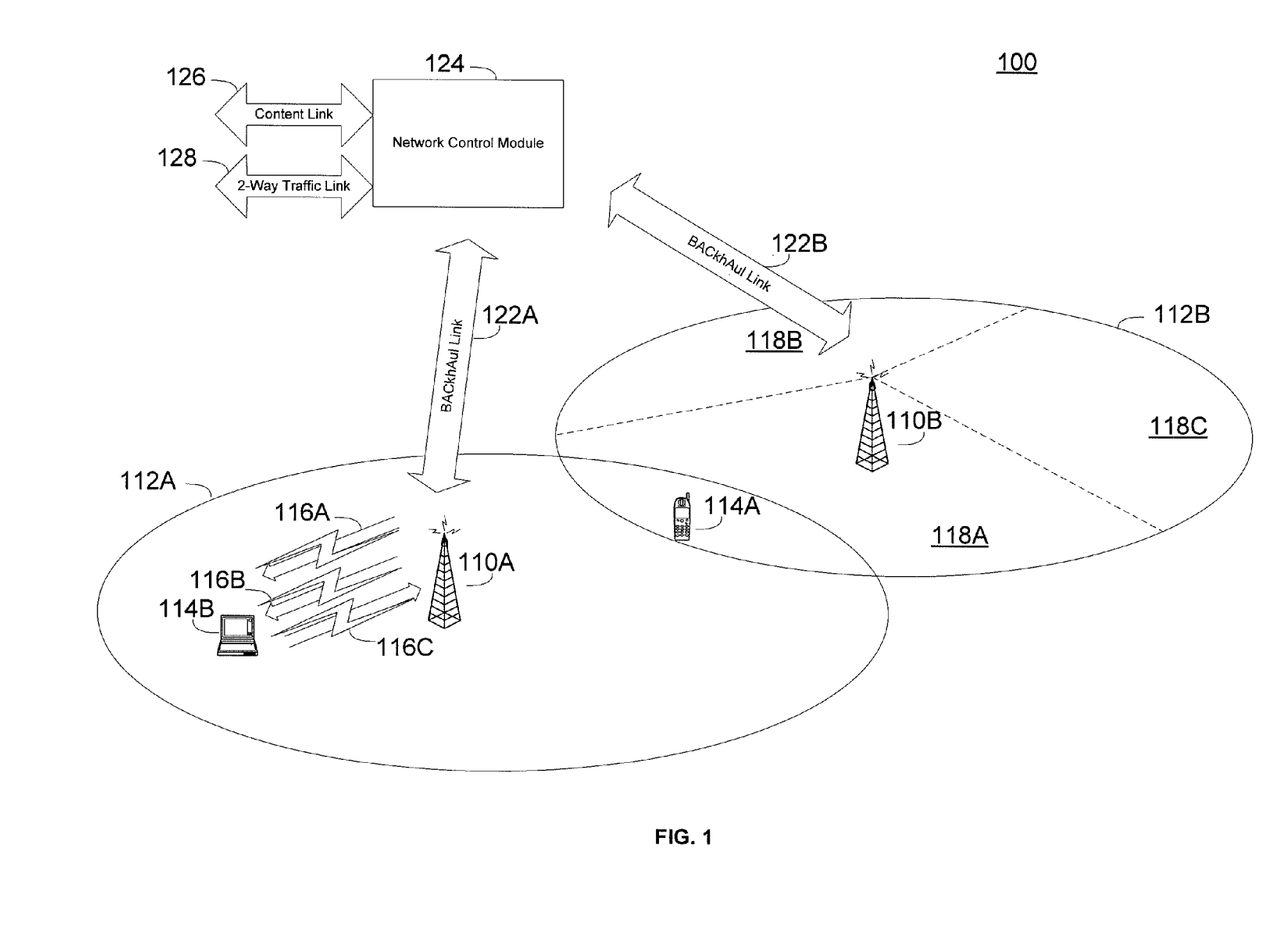
FIG. 1 depicts an example of a network including client stations and base stations.

FIG. 1 is a simplified functional block diagram of an embodiment of a wireless communication system 100. The wireless communication system 100 includes a plurality of base stations 110A and 110B, each supporting a corresponding service or coverage area 112A and 112B. The base stations are capable of communicating with wireless devices within their coverage areas. For example, the first base station 110A is capable of wirelessly communicating with a first client station 114A and a second client station 114B within the coverage area 112A. The first client station 114A is also within the coverage area 112B and is capable of communicating with the second base station 110B. In this description, the communication path from the base station to the client station is referred to as a downlink, such as downlinks 116A-B, and the communication path from the client station to the base station is referred to as an uplink, such as uplink 116C.

Although for simplicity only two base stations are shown in FIG. 1, a typical wireless communication system 100 includes a much larger number of base stations. The base stations 110A and 110B can be configured as cellular base station transceiver subsystems, gateways, access points, radio frequency (RF) repeaters, frame repeaters, nodes, or any wireless network entry point.

The base stations 110A and 110B can be configured to support an omni-directional coverage area or a sectored coverage area. For example, the second base station 110B is depicted as supporting the sectored coverage area 112B. The coverage area 112B is depicted as having three sectors, 118A, 118B, and 118C. In typical embodiments, the second base station 110B treats each sector 118 as effectively a distinct coverage area.

Although only two client stations 114A and 114B are shown in the wireless communication system 100, typical systems are configured to support a large number of client stations. The client stations 114A and 114B can be mobile, nomadic, or stationary units. The client stations 114A and 114B are often referred to as, for example, mobile stations, mobile units, subscriber stations, wireless terminals, or the like. A client station can be, for example, a wireless handheld device, a vehicle mounted device, a portable device, client premise equipment, a fixed location device, a wireless plug-in accessory or the like. In some cases, a client station can take the form of a handheld computer, notebook computer, wireless telephone, personal digital assistant, wireless email device, personal media player, meter-reading equipment, or the like and may include a display mechanism, microphone, speaker, and memory.

In a typical system, the base stations 110A and 110B also communicate with each other and a network control module 124 over backhaul links 122A and 122B. The backhaul links 122A and 122B may include wired and wireless communication links. The network control module 124 provides network administration and coordination as well as other overhead, coupling, and supervisory functions for the wireless communication system 100.

In some embodiments, the wireless communication system 100 can be configured to support both bidirectional communication and unidirectional communication. In a bidirectional network, the client station is capable of both receiving information from and providing information to the wireless communications network. Applications operating over the bidirectional communications channel include traditional voice and data applications. In a unidirectional network, the client station is capable of receiving information from the wireless communications network but may have limited or no ability to provide information to the network. Applications operating over the unidirectional communications channel include broadcast and multicast applications. In one embodiment, the wireless system 100 supports both bidirectional and unidirectional communications. In such an embodiment, the network control module 124 is also coupled to external entities via, for example, content link 126 (e.g., a source of digital video and/or multimedia) and two-way traffic link 128.

The wireless communication system 100 can be configured to use Orthogonal Frequency Division Multiple Access (OFDMA) communication techniques. For example, the wireless communication system 100 can be configured to substantially comply with a standard system specification, such as IEEE 802.16 and its progeny or some other wireless standard such as, for example, WiBro, WiFi, Long Term Evolution (LTE), or it may be a proprietary system. The subject matter described herein is not limited to application to OFDMA systems or to the noted standards and specifications. The description in the context of an OFDMA system is offered for the purposes of providing a particular example only.

As used herein, IEEE 802.16 refers to one or more Institute of Electrical and Electronic Engineers (IEEE) Standard for Local and metropolitan area networks, Part 16: Air Interface for Fixed Broadband Wireless Access Systems, 1 Oct. 2004, IEEE Standard for Local and metropolitan area networks, Part 16: Air Interface for Fixed and Mobile Broadband Wireless Access Systems, 26 Feb. 2006, and any subsequent additions or revisions to the IEEE 802.16 series of standards.

In some embodiments, downlinks 116A-B and uplink 116C each represent a radio frequency (RF) signal. The RF signal may include data, such as voice, video, images, Internet Protocol (IP) packets, control information, and any other type of information. When IEEE-802.16 is used, the RF signal may use OFDMA. OFDMA is a multi-user version of orthogonal frequency division multiplexing (OFDM). In OFDMA, multiple access is achieved by assigning to individual users groups of subcarriers (also referred to as tones). The subcarriers are modulated using BPSK (binary phase shift keying), QPSK (quadrature phase shift keying), QAM (quadrature amplitude modulation), and carry symbols (also referred to as OFDMA symbols) including data coded using a forward error-correction code.

In some embodiments, a base station is implemented using multiple-input and multiple-output (MIMO). When MIMO is used, a base station may include a plurality of antennas. For example, base station 110A may be configured for MIMO and include a precoder (described further below) coupled to two or more antennas for the MIMO transmission via downlinks 116A-B. The precoder is configured to perform "precoding," which refers to beamforming to support MIMO transmission at each of the antennas (e.g., using singular vectors to weight orthogonal "eigen-beams" transmitted via each of the antennas). A client station may include a plurality of antennas to receive the MIMO transmission sent via downlinks 116A-B. The client station may also combine the received signals, which may result in fewer errors and/or enhanced data transfer. Although the examples given herein are made in the context of MIMO, other smart antenna techniques may be used as well including MISO (multiple-input, single-output) and SIMO (single-input, multiple-output).

Moreover, when MIMO is used, the base station may perform preceding (which may use channel estimation information) to code, for each antenna, one or more streams of symbols for transmission over the corresponding antenna. In a closed loop feedback-based approach, the channel estimation information is provided by the receiver, such as a client station, to the transmitter, such as a base station. For example, a client station may receive each of the downlinks 116A-B transmitted by the antennas of the base station, decode the received downlink signals, determine channel estimation information for the decoded channels (e.g., subcarriers) in each of the received downlink signals, and then provide to the base station the determined channel estimation information, which serves as feedback.

The channel estimation information provided by the client station may include a precoder matrix indicator (PMI), rank information (e.g., the rank of a MIMO channel), and other received channel information which may be used to characterize the channel, such as a carrier-to-interference-plus-noise (CINR) ratio, a differential CINR, and the like. The client station typically uses received channel information (e.g., using received data symbols or a pilot signal) to characterize the channel and, in some cases, to determine a preceding matrix. In the case of a preceding matrix, the precoding matrix is selected using a codebook by, for example, selecting an index associated with an optimum precoding matrix, i.e., a precoding matrix indicator (PMI) consistent with IEEE 802.16.

In some implementations, the channel estimation information provided by the client station to the base station is used as feedback, enabling the base station to configure the precoder at the base station. Moreover, the feedback may be sent as part of a fast feedback control channel from the client station to the base station. For example, in some implementations, a CQICH (channel quality indicator channel) from the client station to the base station is used to provide the channel estimation information. Specifically, the channel estimation information is sent as feedback via the CQICH described by IEEE 802.16 and configured as further described below.

The channel estimation information is provided via the CQICH, which serves to provide a fast mechanism to feedback information to the base station. In the case of IEEE 802.16, when the base station requests feedback values via an allocation of the CQICH, a message, such as a CQICH Information Element (IE), is used to provide the information to the base station to report the most recent channel estimation information of the downlink (or bands within the downlink). This channel estimation information may be used by the base station (and, e.g., the precoder) to configure MIMO operation at the base station.

Figure 2A:
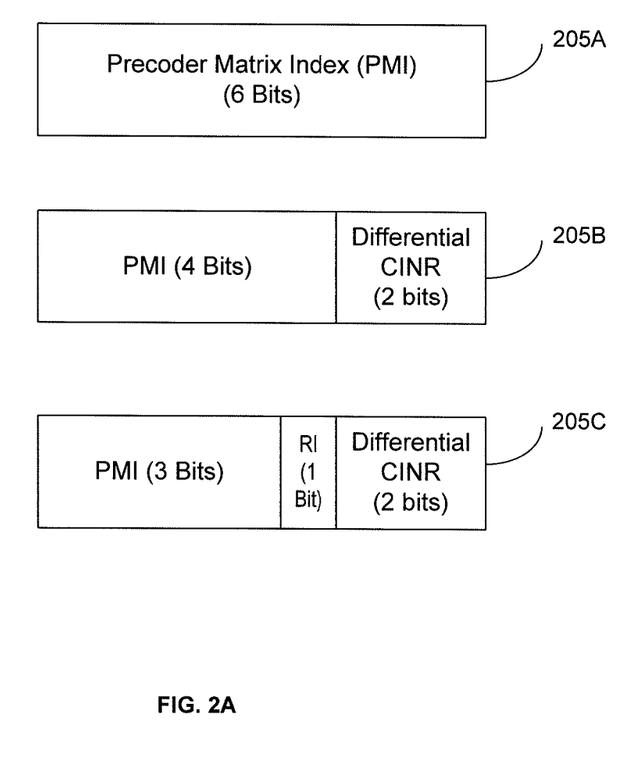
FIG. 2A depicts payloads sent as feedback by the client station to the base station.

FIG. 2A depicts examples of channel estimation information sent as feedback by the client station to the base station via the CQICH. The feedback may include a payload of 6 bits. For example, the payload 205A includes 6 bits used to feedback PMI from the client station to the base station. The payload 205B may be used to feedback from the client station to the base station the PMI using 4 bits and a differential CINR using 2 bits. The payload 205C may be used to feedback from the client station to the base station the PMI using 3 bits, a differential CINR using 2 bits, and rank information using 1 bit. Although FIG. 2A depicts three examples of payloads 205A-C, other types and sizes of payloads may be used as well. The different payload options depicted at FIGS. 2A-C allow the client station to provide different information to the base station depending on the channel condition and usage scenario. For example, payload 205B may be used when there are 4 transmit antennas at the base station, as a 4 bit PMI would have a higher performance gain than 3 bit PMI. By selectively trading off the data that is fed back to the base station, the bandwidth used in CL-MIMO may be optimized after sacrificing performance.

Figure 2B:
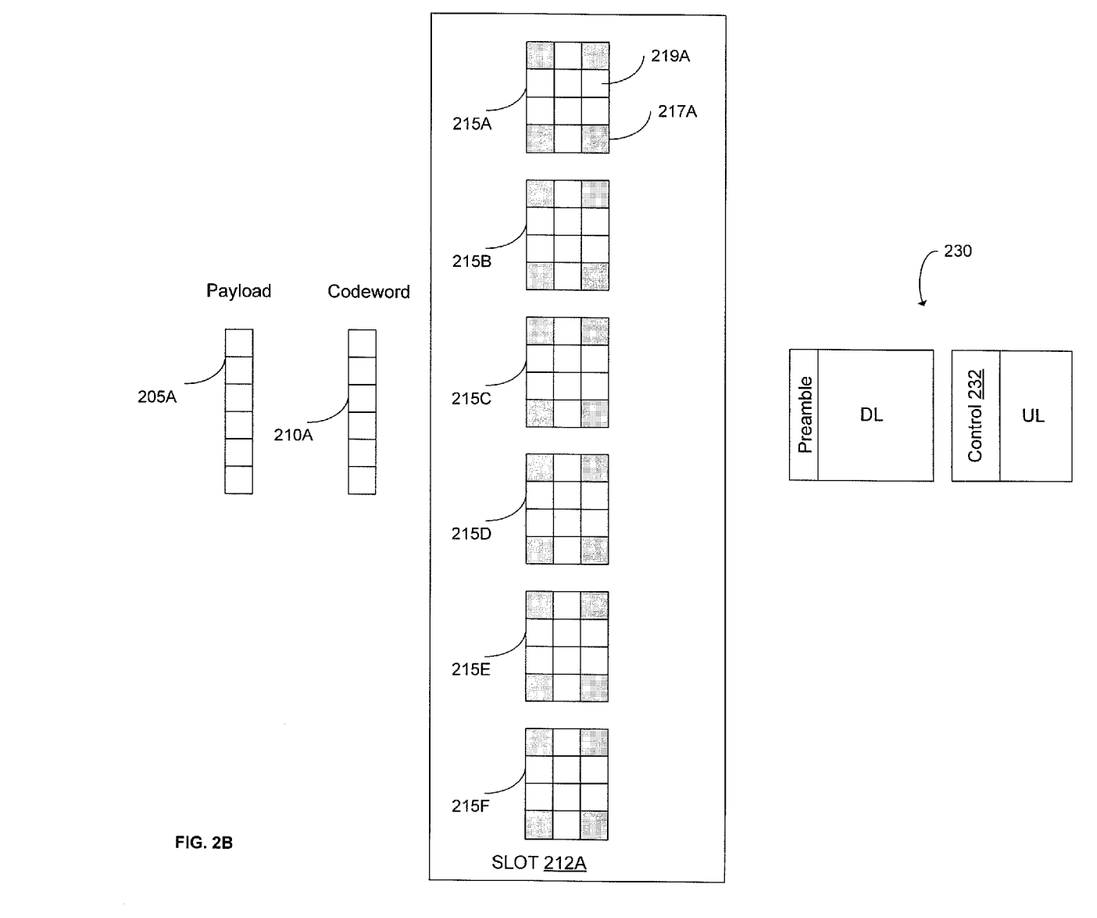
FIG. 2B depicts processing of a payload sent as feedback to the base station.

FIG. 2B depicts how a client station may provide the payload, such as the payloads 205A-C, sent as feedback to the base station. In some implementations, rather than use all 6 tiles 215A-F of the slot 212A, a subset of the tiles are used in any given slot, as described further below.

The payload, such as payload 205A, may be encoded (e.g., using a codebook) into a coded payload 210A. Once coded, the coded payload 210A may be transmitted in a slot 212A. The slot 212A represents a single subchannel of the uplink 116C and, in this example, the slot 212A includes 6 tiles 215A-F. For example, FIG. 2B depicts a slot 212A including 6 tiles 215A-F modulated using 8-ary orthogonal modulation. The tiles 215A-F include pilot tones (e.g., represented by the shaded boxes, such as pilot tone 217A shaded in gray) and data tones (e.g., represented by the un-shaded boxes, such as data tone 219A). The slot 212A is transmitted from the client station to the base station during the control portion 232 of frame 230 (e.g., as part of a CQICH). Although frame 230 is depicted as a frame typically used in IEEE 802.16, other types of frame structures may be used as well. Moreover, although payload 205A is depicted as having 6 bits, other sizes of payloads may be used as well.

Rather than transmit all 6 bits of the encoded payload in all of the tiles 215A-F of the slot 212A, the client station may use a subset of the slot 212A (e.g., only the even tiles, only the odd tiles, and the like) to provide the encoded payload 210A to the base station. The use of the subset of a slot matches the amount information to be transmitted to the base station. However, when the same information is transmitted in a full slot, the full slot transmission may have better reliability over the ½ slot.

Figure 2C:
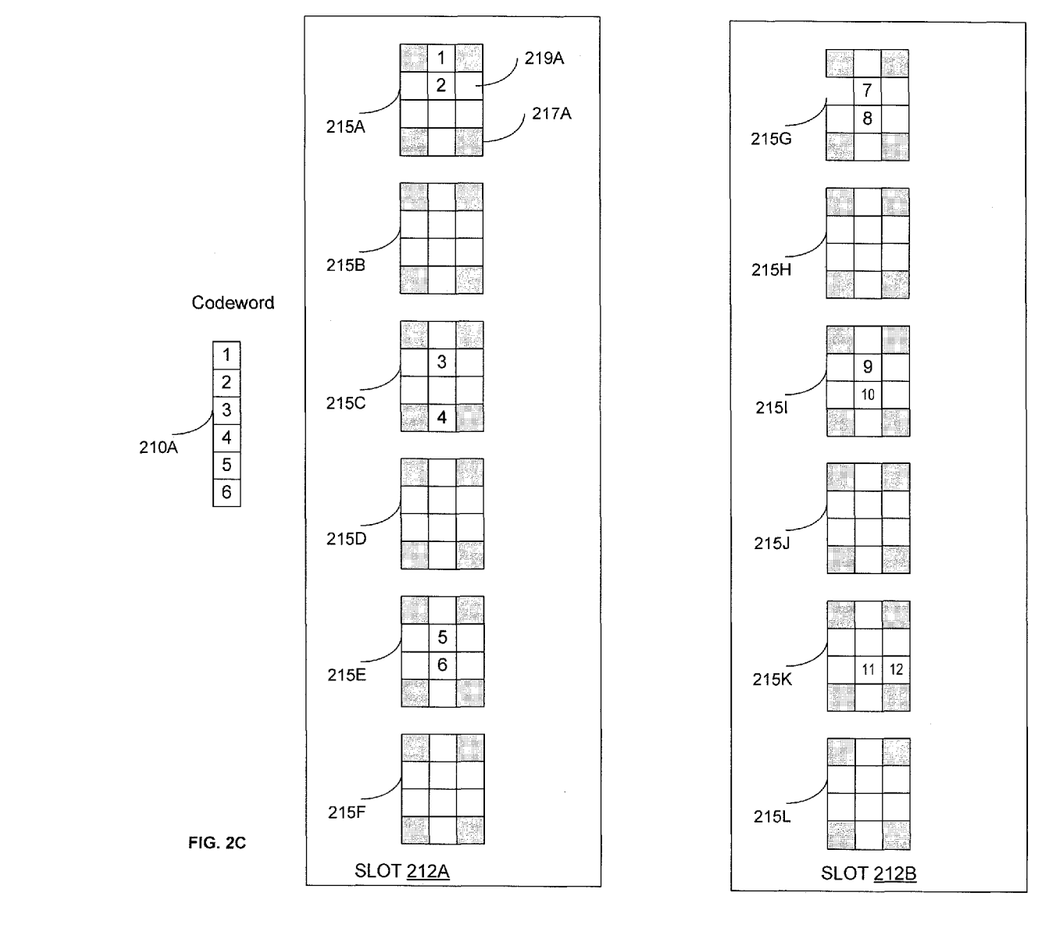
FIG. 2C depicts processing of a payload sent as feedback using a half slot implementation.

In some implementations, a half slot is used to transmit the feedback information included in the encoded payload 210A. FIG. 2C depicts an example of the half (½) slot implementation in which the even tiles 215A, C, E are used to carry the bits of payload 210A. The payload may be coded, as noted above, or un-coded. Moreover, the payload 210A may include channel estimation information, which in some implementations is configured as one or more of payloads 205A-C of FIG. 2A. In the example of FIG. 2C, tile 215A carries the first two bits (labeled 1 and 2), tile 215C carries two more bits of payload 210A (labeled 3 and 4), and so forth. The slot 212A is then sent from the client station to the base station via, for example, the CQICH (e.g., within the control portion 232 of the frame 230 transmitted via the uplink 116C). In a subsequent slot 212B, the remaining bits of payload 210A (i.e., bits 7-8) are transmitted in the even tiles of slot 212B. The slot 212B is then sent as feedback from the client station to the base station via, for example, the CQICH. Although FIG. 2C depicts the even tiles being used to carry the bits of the payload, in other implementations, the odd tiles are used.

Figure 2D:
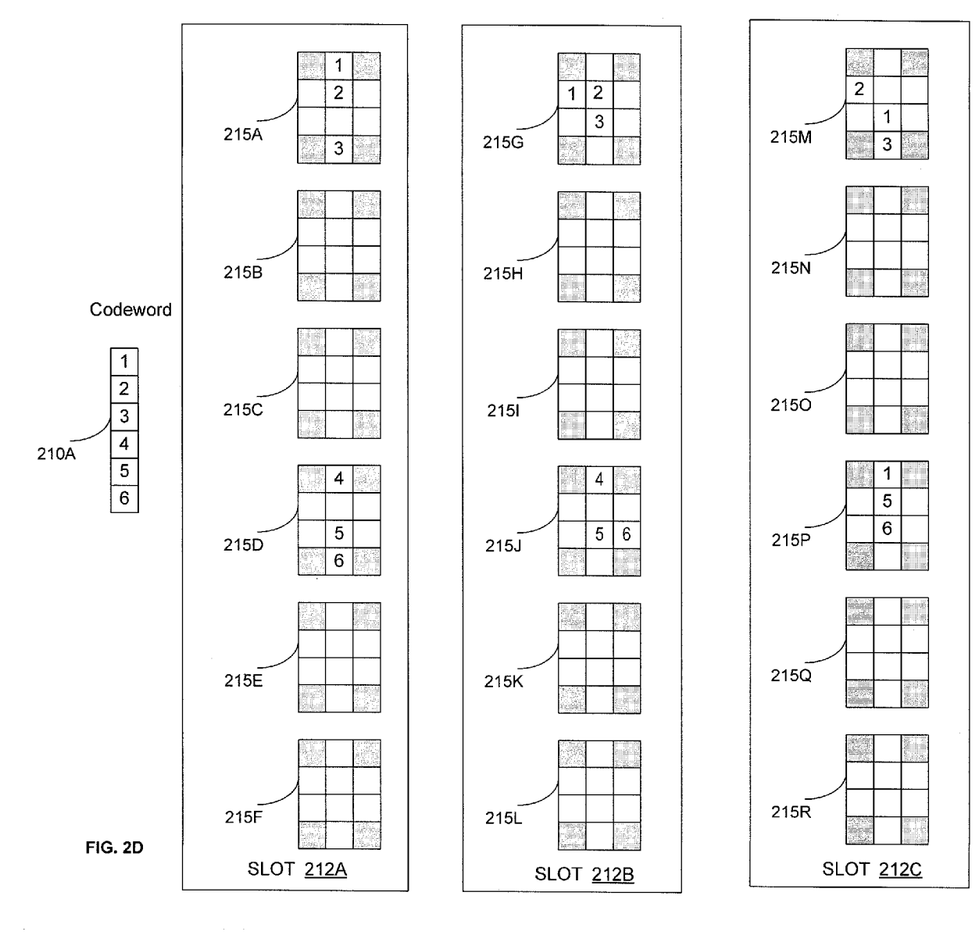
FIG. 2D depicts processing of a payload sent as feedback using a ⅓ slot implementation.

FIG. 2D depicts an example of the ⅓ slot implementation in which 2 of the 6 tiles per slot are used to carry the payload 210A. In the example of FIG. 2D, each of the tiles carries 3 bits of information. The slots 212AC are then sent as feedback from the base station to the client station via, for example, the CQICH.

In some implementations, the client station signals to the base station whether the client station implements a ½ slot implementation, a ⅓ slot implementation, or any other type of slot configuration. For example, the client station may signal the implementation type as described further below with respect to Table. 1. Moreover, the client station may implement a ½ slot or a ⅓ slot implementation rather than use all the tiles of the slot in order to improve throughput, but this improvement comes at the expense of a less robust feedback mechanism, and thus a less reliable MIMO configuration by the precoder at the base station. By reducing a given client's use of the feedback channel, such as the CQICH (e.g., by only allocating ½ of the tiles of a slot to a client station), other client stations may be able to utilize the tones of a tile to feedback information to the base station.

Figure 2E:
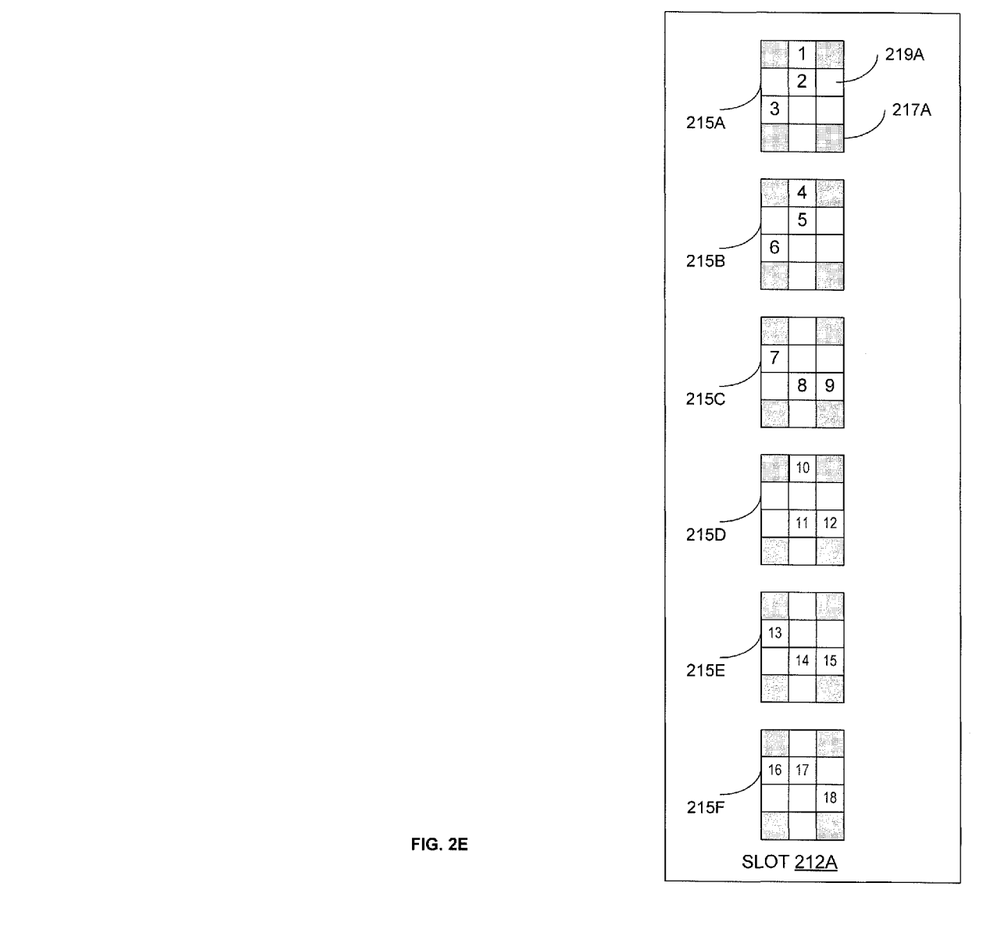
FIG. 2E depicts an example of 18 bits of payload information sent as feedback.

Although the above example illustrates using a given subset of the tiles of the slot, in some implementations, the client station may other tones or other tiles as will. For example, rather than insert a bit of the payload in each tile, the client station may insert a plurality of bits of the payload into each tile. FIG. 2E depicts an example of the 18 bits of feedback information, such as 18 bits of payload(s), carried by slot 212A. In the example, tiles 215A-F include 18 bits (labeled 1-18). These 18 bits correspond to feedback information carried by the slot 212A sent from the client station to the base station via, for example, the CQICH. In the example of FIG. 2E, the client station provides more feedback to the base station in an effort to improve the ability of the precoder and base station to properly configure the MIMO beamforming of the base station. This 18-bit implementation depicted at FIG. 2E typically results in higher overhead, and, thus, a reduction in the throughput of the channel.

Figure 3:
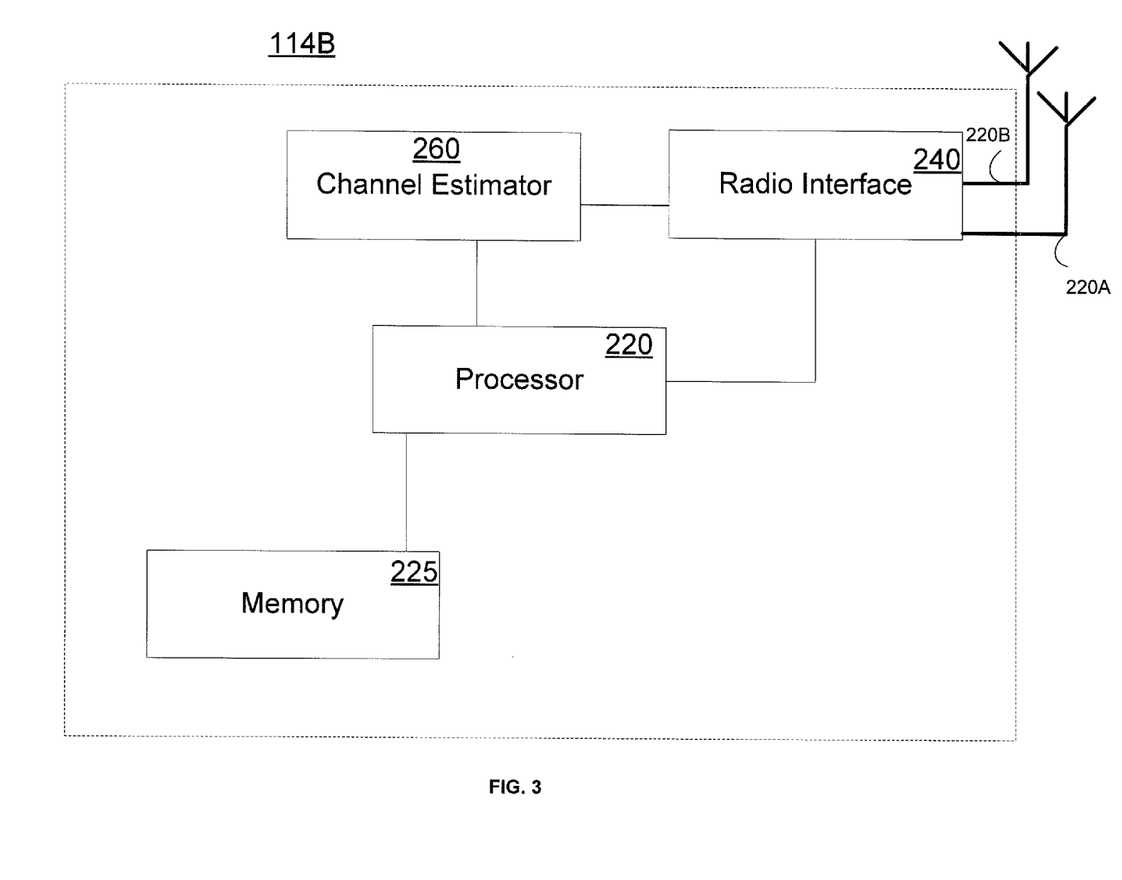
FIG. 3 depicts a client station configured with a channel estimator to enable closed loop MIMO operation.

FIG. 3 depicts an exemplary client station, such as client station 114B. The client station 114B includes a plurality of antennas 220A-B for receiving the downlinks 116A-B, each transmitted by a base station, such as base station 110A, which implements MIMO as described further below. Although the examples described herein refer to two antennas at the base station and two antennas at the client station, other quantities of antennas can be used at the base station and the client station. The client station 114B also includes a radio interface 240, which may include other components, such as filters, converters (e.g., digital-to-analog converters and the like), symbol demappers, an Inverse Fast Fourier Transform (IFFT) module, and the like, to process the received MIMO transmission sent via downlinks 116A-B, to determine channel estimation information, and to decode any data, such as the symbols, carried by the tones of the downlinks. In some implementations, the client station 114B is also compatible with IEEE 802.16 and MIMO transmissions (which are sent via downlinks 116A-B), although MIMO implementations using other wireless technologies, such as LTE, WiBro, and the like, may also be implemented using the subject matter described herein.

The client station 114B further includes a channel estimator 260 for determining the channel estimation information, a processor 220 for controlling client station 114B and for accessing and executing program code stored in memory 225.

For each of the MIMO transmissions sent via downlinks, the channel estimator 260 may determine channel estimation information, such as a precoder matrix indicator (PMI), rank information (e.g., the rank of a MIMO channel), and other received channel information (e.g., CINR, a differential CINR, and the like), and then feedback that information and other information from the client station to the base station. The channel estimation information may be sent via a feedback channel, such as the CQICH, to enable configuring a closed loop MIMO precoder at the base station. Moreover, the feedback from the client station to the base station may be in the form of analog information, digital information, or a combination of both. For example, the digital information may include quantized channel estimation information, such as one or more singular vectors of a V matrix, and the analog information may include the PMI, differential CINR, and rank information. The processor 220 may also generate messages to provide the channel estimation information (e.g., as payloads 205A-C), to the base station in format consistent with IEEE 802.16, although other formats may be used as well.

Figure 4:
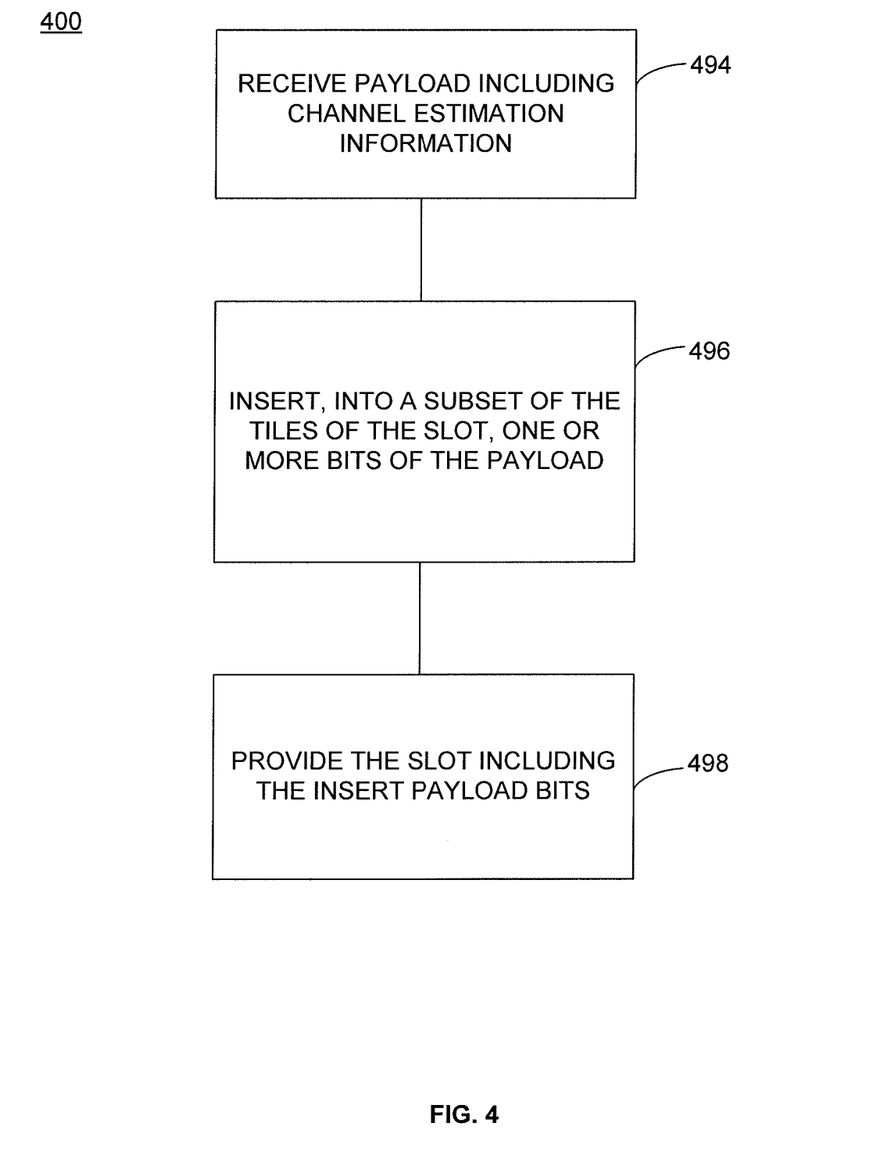
FIG. 4 depicts a process for inserting bits into a payload including channel estimation information used to configure beamforming used in a closed loop MIMO system.

FIG. 4 depicts a process 400 for processing payloads at the client station. The description of process 400 will also refer to FIGS. 1, 2A, 2C, 2D, and 3.

At 494, the client station, such as client station 114B, receives one or more payloads representing channel estimation information. For example, channel estimator 260 may feedback channel estimation information to the base station, and, in particular, feedback the information to a precoder at the base station. The feedback enables the precoder to configure MIMO beamforming at the base station. Channel estimator 260 may configure the feedback to the precoder using, for example, payloads 205A-C or 210A.

At 496, one or more bits of the payload may be inserted into a subset of the tiles of a slot. For example, channel estimator 260 (or processor 220) may insert one or more bits of payload 210A into a subset of tiles of slot 212A rather than use all of the tiles of the slot 212A. Referring to FIG. 2C, bits of payload 210A are inserted into a subset of the tiles 215A, C, and E of slot 212A. Referring to FIG. 2D, bits of payload 210A are inserted into a subset of the tiles 215A and D of slot 212A, bits of payload 210A are inserted into a subset of tiles 215G and J of slot 212B, and so forth.

At 498, the slot including the inserted bits is provided to enable transmission from the client station to the base station. Referring to FIGS. 2C and 3, processor 220 may provide to radio interface 240 the slot 212A including tiles 215A-F, in which tile 215A carries a bits (labeled 1 and 2) of payload 210A, tile 215C carries bits of payload 210A (labeled 3 and 4), and the tile 215F carries the bits of payload 210A (labeled 5 and 6). The radio interface 240 transmits, via at least one of antennas 220A-B, the slot 212A to the base station using a control channel, such as the CQICH within the control portion 232 of the frame 230. The client station may similarly transmit the slots depicts in FIGS. 2B, 2D, and 2E.

Figure 5:
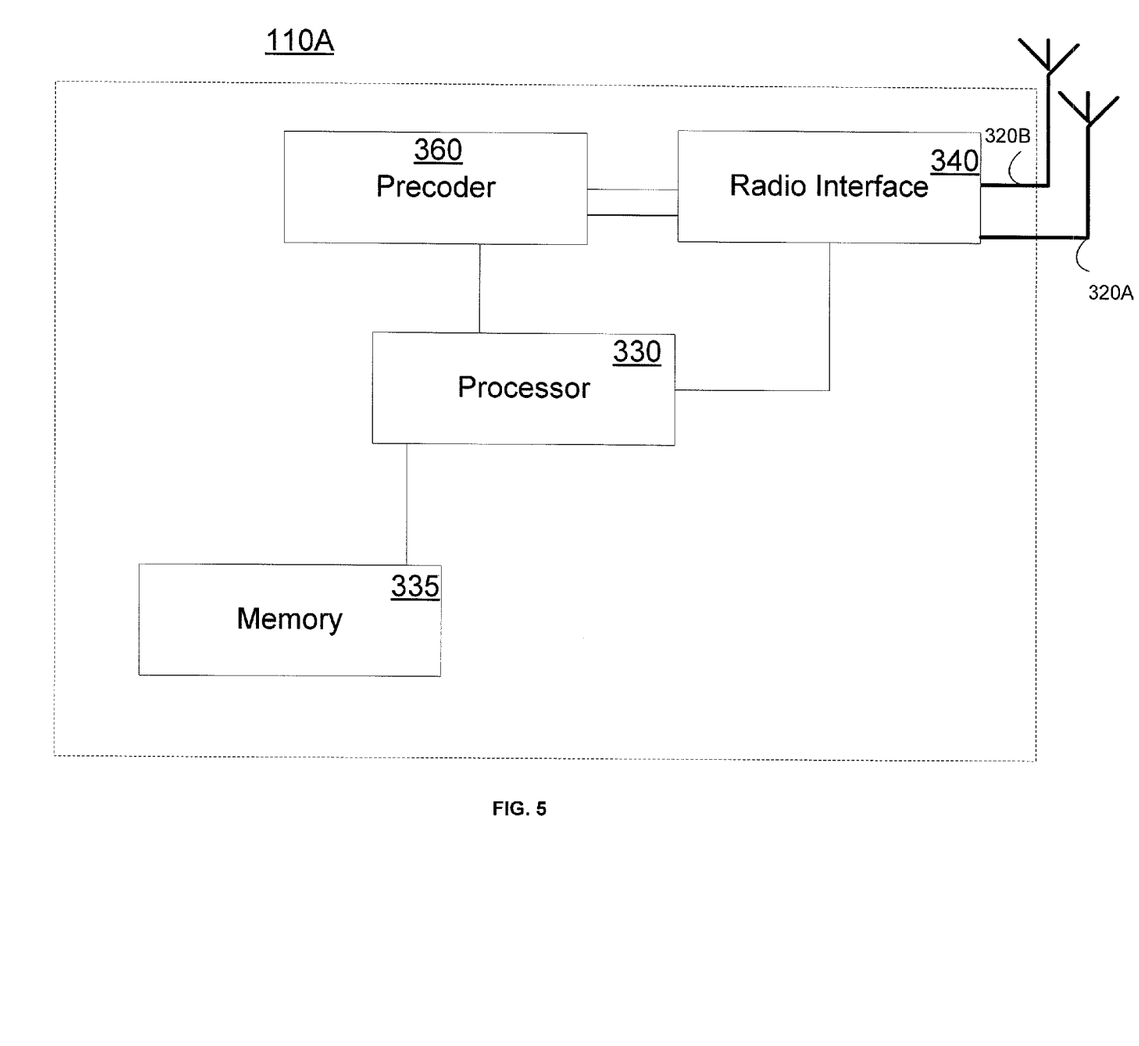
FIG. 5 depicts a base station configured with a precoder used to configure closed loop MIMO.

FIG. 5 depicts a base station, such as base station 110A. The base station 110A includes antennas 320A-B configured to transmit via downlinks 116A-B, and the base station 110A is also configured to receive uplink 116C via at least one of antennas 320A-B. The base station 110A further includes a radio interface 340 coupled to the antennas 320A-B, a precoder 360 (described further below), and a processor 330 for controlling base station 110A and for accessing and executing program code stored in memory 335. The radio interface 340 further includes other components, such as filters, converters (e.g., digital-to-analog converters and the like), mappers, a Fast Fourier Transform (FFT) module, and the like, to generate a MIMO transmission via downlinks 116A-B and to receive feedback (e.g., channel estimation information) provided via uplink 116C from client station 114B. The received feedback is used at precoder 360. In some implementations, the base station 110A, RF signals of the MIMO downlinks 116A-B, and uplink 116C are compatible with IEEE 802.16, although other technologies may be used as well.

The radio interface 340 decodes the uplink 116C carrying the feedback, such as analog information, digital information, or a combination of both, and, as such, obtains the payload information carried by the tiles of a slot transmitted by the client station 114B. Moreover, the payload may include, for example, digital information, such as quantized channel estimation information (e.g., one or more singular vectors of a matrix V), and, more typically, the payload includes analog information, such as the PMI, differential CINR, and rank information. The decoded feedback information, which is carried by the tiles of the slots, may be provided to the precoder 360. The precoder 360 is configured based on the received feedback information carried by the tiles of the slot transmitted by the client station via, for example, the CQICH to the base station.

Figure 6:
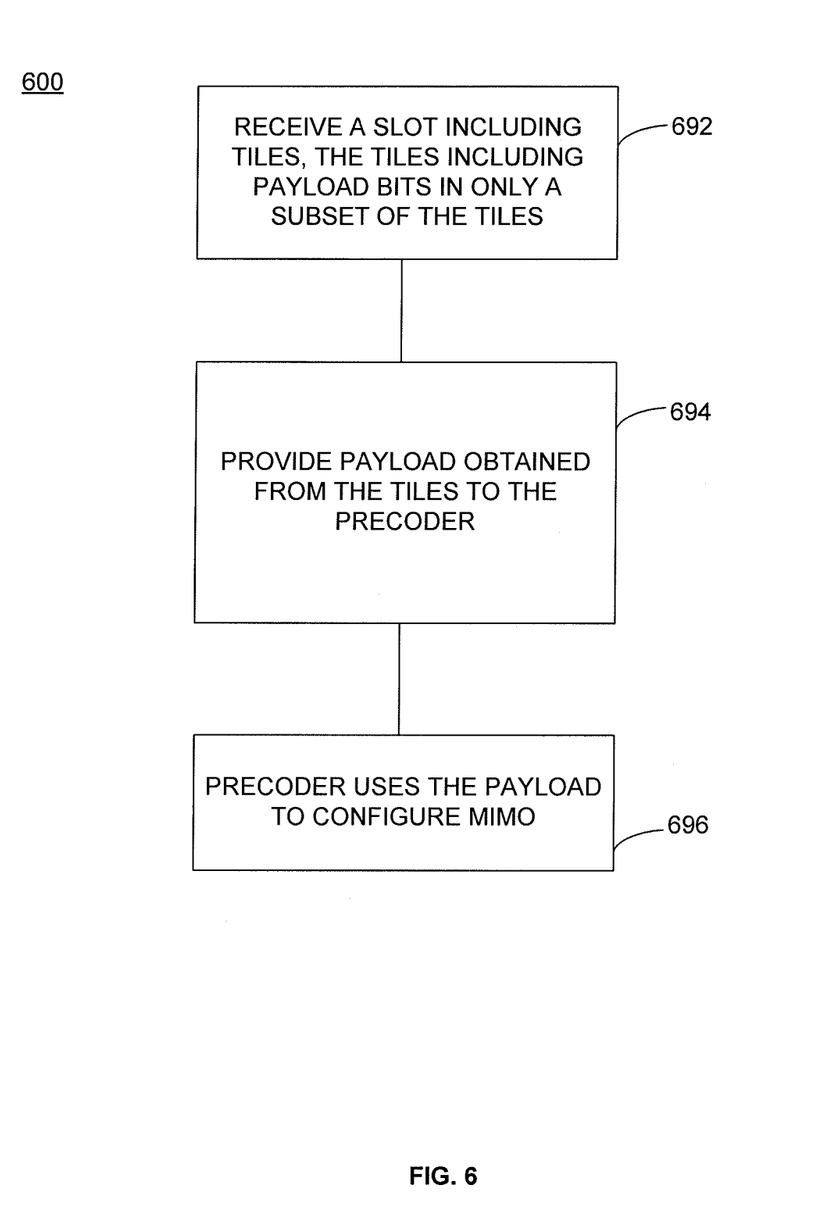
FIG. 6 depicts a process for using a payload including channel estimation information transmitted in a subset of the tiles of a slot in closed loop MIMO system.

FIG. 6 depicts a process 600 at a base station to use payload sent via a subset of the tiles of a slot. The description of process 600 will refer to FIGS. 2C, 2D, 2E, and 5 as well.

At 692, the base station 11 0A and, more particularly, the radio interface 340 receives a slot including tiles, of which payload bits have been inserted into only a subset of the tiles rather than all of the tiles of the slot. For example, radio interface 340 may receive slot 212A of FIG. 2C and decode the slot 212A and tiles 215A-F. In the example of FIG. 2C, only a subset of the tiles 215A, C, and E carry bits of the payload, such as payloads 205A-C or coded payload 210A. Radio interface 340 may similarly process other tiles, such as the tiles depicted at FIGS. 2D-E.

At 694, the payload obtained from the slot is provided to the precoder. For example, radio interface 340 may provide to precoder 360 the payload bits obtained from slot 212A transmitted via CQICH and uplink 116C. In the example of FIG. 2C, precoder 360 may receive the bits carried by even tiles 215A, C, and E. The radio interface 340 may provide to precoder 360 subsequent payload bits obtained from other slots, such as slot 212B transmitted via CQICH and uplink 116C.

At 696, the payload obtained at 694 is used to configure the precoder 360. Specifically, the precoder 360 uses the payload information, such as the PMI, rank information, CINR, and/or differential CINR) to configure beamforming used in connection with MIMO transmissions to a client station.

In some implementations, enhanced fast-feedback slots may be individually allocated to a client station for transmission of physical layer related information that requires a fast response from the client station. The allocations are performed using a variety of techniques including the CQICH_Alloc_IE( ) message described in IEEE 802.16. The CQICH_Alloc_IE( ) message may be configured to define whether ½ slot, ⅓ slot, 18-bit, or any other mechanism is being used. Moreover, a mapping may be predetermined to enable the payloads (e.g., payload 205A-C or an encoded form of payloads 205A-C) to be mapped directly to the tones of the tiles.

Moreover, the feedback information provided to the base station may be used by a precoder configured for one or more (if not all) of the bands of the downlinks. For example, the subject matter described herein may be used as an efficient CQICH feedback mechanism configured for feeding back a PMI, rank information, and CINR of one or more bands to support closed loop MIMO configured in Band AMC (e.g., in which each band can use a different code rate and modulation scheme), although the subject matter described herein may be used in other implementations as well.

In some implementations, the feedback mechanisms using CQICH described above enable a robust feedback that provides flexibility, when compared to approaches that simply use a fixed amount of 6 bits of feedback per slot. For closed loop MIMO, the amount of feedback required is typically higher than 6 bits per slot and, as such, a flexible mechanism as described herein is used to provide robustness with enhanced throughput. In the case of a client station with low uplink CINR, the client station may provide to the base station fewer payload bits as feedback. On the other hand, a client station with a higher uplink CINR may provide to the base station more payload bits as feedback.

Table 1 below depicts a CQICH Enhanced Allocation IE format (which may be implemented as part of IEEE 802-16 as well as other standards). The CQICH Enhanced Allocation IE format may be used by the client station to signal to the base station whether the ½, ⅓, 18-bit, or some other format is being used to feedback closed loop MIMO information to the base station.

TABLE 1

CQICH Enhanced Allocation IE format

| Syntax | Size (bits) | Notes |
|---|---|---|
| CQICH_Enhanced_ALLOC_IE | | |
| CQICH Type | 3 | 0b000: 6-bit CQI |
| | | 0b001: 18-bit CQI |
| | | 0b010: 3-bit CQI (even) |
| | | 0b011: 3-bit CQI(odd) |
| | | 0b100: 6-bit CQI (primary) |
| | | 0b101: 4-bit CQI (secondary) |
| | | 0b110: 6-bit CQI (even) |
| | | 0b111: 6-bit CQI(odd) |

The subject matter described herein may be embodied in systems, apparatus, methods, and/or articles depending on the desired configuration. Base station 110A (or one or more components therein) can be implemented using one or more of the following: a processor executing program code, an application-specific integrated circuit (ASIC), a digital signal processor (DSP), an embedded processor, a field programmable gate array (FPGA), and/or combinations thereof. Client station 114B (or one or more components therein) can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method operable with at least one client device in a closed loop operation of a wireless system, comprising:

receiving, at the at least one client device, a payload, including channel estimation information from a closed loop base station;

inserting, at the at least one client device, into a subset of tiles of a slot, one or more bits of the payload; and providing, at the at least one client device, the slot to said closed loop base station, including the subset of the tiles carrying the one or more bits of the payload, wherein said slot is used as feedback enabling said closed loop base station to configure a precoder in said channel estimation information.

2. The method of claim 1 further comprising:
configuring the payload to 6 bits comprising a precoder matrix index.

3. The method of claim 1 further comprising:
configuring the payload to 6 bits comprising 4 bits representing a precoder matrix index and 2 bits representing a differential carrier-to-interference-plus-noise ratio.

4. The method of claim 1 further comprising:
configuring the payload to 6 bits comprising 3 bits representing a precoder matrix index, 2 bits representing a differential carrier-to-interference-plus-noise ratio, and 1 bit representing rank information.

5. The method of claim 1, wherein inserting further comprises:
inserting the payload into a subset of ½ of the tiles of the slot.

6. The method of claim 1, wherein inserting further comprises:
inserting the payload into a subset of ⅓ of the tiles of the slot.

7. The method of claim 1, wherein inserting further comprises:
inserting 18-bits of payload into the tiles of the slot.

8. The method of claim 1, wherein inserting further comprises:
inserting the payload into a plurality of even tiles of the slot.

9. The method of claim 1, wherein inserting further comprises:
inserting the payload into a plurality of odd tiles of the slot.

10. The method of claim 1, wherein providing further comprises:
transmitting, from the client device to the base station, the slot including the subset of the tiles carrying the one or more bits of the payload using a channel quality indicator channel.

11. A system, comprising:
a processor; and
a memory,
wherein the processor and memory are configured to:
receive a payload including channel estimation information from a closed loop base station,
insert, into a subset of tiles of a slot, one or more bits of the payload, and
provide the slot to said closed loop base station, including the subset of the tiles carrying the one or more bits of the payload, wherein said slot is as feedback enabling said closed loop base station to configure a precoder in said channel estimation information.

12. The system of claim 11, wherein the processor and the memory are configured to provide the payload as 6 bits comprising a precoder matrix index.

13. The system of claim 11, wherein the processor and the memory are configured to provide the payload as 6 bits comprising 4 bits representing a precoder matrix index and 2 bits representing a differential carrier-to-interference-plus-noise ratio.

14. The system of claim 11, wherein the processor and the memory are configuring to provide the payload as 6 bits comprising 3 bits representing a precoder matrix index, 2 bits representing a differential carrier-to-interference-plus-noise ratio, and 1 bit representing rank information.

15. The system of claim 11, wherein inserting further comprises:
inserting the payload into a subset of ½ of the tiles of the slot.

16. The system of claim 11, wherein inserting further comprises:
inserting the payload into a subset of ⅓ of the tiles of the slot.

17. The system of claim 11, wherein inserting further comprises:
inserting 18-bits of payload into the tiles of the slot.

18. A non-transitory computer-readable storage medium containing instructions to configure a processor to:
receive a payload including channel estimation information from a closed loop base station, including channel estimation information,
insert, into a subset of tiles of a slot, one or more bits of the payload, and
provide the slot to said closed loop base station, including the subset of the tiles carrying the one or more bits of the payload, wherein said slot is used as feedback enabling said base station to configure a precoder in said channel estimation information.

19. The non-transitory computer-readable storage medium of claim 18, wherein the instructions further configure the processor to provide the payload as 6 bits comprising a precoder matrix index.

20. The non-transitory computer-readable storage medium of claim 18, wherein the instructions further configure the processor to provide the payload as 6 bits comprising:
4 bits representing a precoder matrix index; and
2 bits representing a differential carrier-to-interference-plus-noise ratio.

* * * * *